(12) United States Patent
Nakahara

(10) Patent No.: US 8,699,044 B2
(45) Date of Patent: Apr. 15, 2014

(54) INFORMATION PROCESSING APPARATUS, METHOD OF CONTROLLING INFORMATION PROCESSING APPARATUS, AND STORAGE MEDIUM

(75) Inventor: Hidetaka Nakahara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 454 days.

(21) Appl. No.: 12/708,214

(22) Filed: Feb. 18, 2010

(65) Prior Publication Data

US 2010/0214588 A1 Aug. 26, 2010

(30) Foreign Application Priority Data

Feb. 23, 2009 (JP) ................. 2009-038931

(51) Int. Cl.
*G06F 3/12* (2006.01)
(52) U.S. Cl.
USPC ............ 358/1.13; 358/1.15; 358/1.16; 347/5; 715/744
(58) Field of Classification Search
None
See application file for complete search history.

(56) References Cited

U.S. PATENT DOCUMENTS

| | | | | |
|---|---|---|---|---|
| 6,847,466 B1 * | 1/2005 | Gazdik et al. | ................ | 358/1.15 |
| 6,909,520 B2 * | 6/2005 | Ogino | ................ | 358/1.15 |
| 6,967,728 B1 * | 11/2005 | Vidyanand | ................ | 358/1.12 |
| 7,057,747 B1 * | 6/2006 | Minagawa | ................ | 358/1.13 |
| 7,161,693 B2 * | 1/2007 | Kizaki et al. | ................ | 358/1.13 |
| 7,325,235 B2 * | 1/2008 | Iida et al. | ................ | 719/310 |
| 7,372,590 B2 * | 5/2008 | Kuroda | ................ | 358/1.15 |
| 7,542,159 B2 * | 6/2009 | Yamada | ................ | 358/1.15 |
| 7,545,522 B1 * | 6/2009 | Lou | ................ | 358/1.14 |
| 7,609,400 B2 * | 10/2009 | Kuroda et al. | ................ | 358/1.13 |
| 7,768,661 B2 * | 8/2010 | Mitsui | ................ | 358/1.13 |
| 7,839,516 B2 * | 11/2010 | Tomita et al. | ................ | 358/1.15 |
| 7,873,610 B2 * | 1/2011 | Poulsen | ................ | 707/694 |
| 7,894,083 B2 * | 2/2011 | Kuroda et al. | ................ | 358/1.13 |
| 8,077,354 B2 * | 12/2011 | Tomomatsu | ................ | 358/1.9 |
| 8,115,954 B2 * | 2/2012 | Tomita | ................ | 358/1.15 |
| 8,223,363 B2 * | 7/2012 | Selvaraj | ................ | 358/1.15 |
| 8,261,259 B2 * | 9/2012 | Hattori | ................ | 717/174 |
| 8,334,988 B2 * | 12/2012 | Sekine | ................ | 358/1.13 |

(Continued)

FOREIGN PATENT DOCUMENTS

CN 1922855 A 2/2007
JP 11-161441 A 6/1999

OTHER PUBLICATIONS

David J. Kappos, Subject Matter Eligibility of Computer Readable Media, Feb. 23, 2010, US Patent and Trademark Office, 1351 OG 212.*

(Continued)

*Primary Examiner* — King Poon
*Assistant Examiner* — Ted Barnes
(74) *Attorney, Agent, or Firm* — Rossi, Kimms & McDowell, LLP

(57) ABSTRACT

An information processing apparatus that lightens the workload for a serviceman or an administrator who imports setting information into the information processing apparatus. The information processing apparatus includes an operation section via which the user can input data. The apparatus stores setting information containing a plurality of settings required for operation control and discriminating information on each setting for discriminating whether the setting is of a common setting item or of an apparatus-specific setting item, changes the discriminating information on each setting of the setting information, according to a specific instruction given by the user via the user interface, and externally outputs the stored setting information.

6 Claims, 16 Drawing Sheets

| SETTING ITEM (ID) | SETTING | DATA TYPE | DATA SIZE | DISCRIMINATION INFORMATION |
|---|---|---|---|---|
| ID1 | SAMPLE | STRING | 6 | APPARATUS-SPECIFIC |
| ID2 | 1 | UBYTE | 1 | APPARATUS-SPECIFIC |
| ID3 | 0 | BOOL | 1 | COMMON |

505

(56) References Cited

U.S. PATENT DOCUMENTS

| | | | |
|---|---|---|---|
| 2003/0030664 A1* | 2/2003 | Parry | 345/744 |
| 2003/0053105 A1* | 3/2003 | Morooka et al. | 358/1.13 |
| 2003/0081019 A1* | 5/2003 | Frolik et al. | 347/5 |
| 2004/0061894 A1* | 4/2004 | Yoshida et al. | 358/1.15 |
| 2004/0218196 A1* | 11/2004 | Van Vliembergen et al. | 358/1.6 |
| 2004/0218197 A1* | 11/2004 | Vliembergen et al. | 358/1.6 |
| 2005/0039007 A1* | 2/2005 | Hoene et al. | 713/170 |
| 2005/0157321 A1* | 7/2005 | Alacar | 358/1.13 |
| 2006/0023246 A1* | 2/2006 | Vidyanand | 358/1.13 |
| 2006/0031766 A1* | 2/2006 | Minagawa | 715/705 |
| 2006/0053217 A1* | 3/2006 | Nagasawa et al. | 709/223 |
| 2006/0055968 A1* | 3/2006 | Sato et al. | 358/1.15 |
| 2006/0132835 A1* | 6/2006 | Nagaraja | 358/1.15 |
| 2007/0070420 A1* | 3/2007 | Kizaki et al. | 358/1.15 |
| 2007/0086022 A1* | 4/2007 | Kumagai | 358/1.1 |
| 2007/0087778 A1* | 4/2007 | Otsuka | 455/550.1 |
| 2007/0236728 A1* | 10/2007 | Kobayashi et al. | 358/1.15 |
| 2008/0079286 A1* | 4/2008 | Ferlitsch et al. | 296/186.1 |
| 2008/0079975 A1* | 4/2008 | Ferlitsch et al. | 358/1.13 |
| 2008/0144088 A1* | 6/2008 | Furuya | 358/1.15 |
| 2008/0180699 A1* | 7/2008 | Selvaraj | 358/1.1 |
| 2008/0180741 A1* | 7/2008 | Miyata | 358/1.15 |
| 2008/0189716 A1* | 8/2008 | Nakahara | 718/105 |
| 2008/0212137 A1* | 9/2008 | Iwata et al. | 358/1.16 |
| 2008/0222181 A1* | 9/2008 | Yoshioka | 707/101 |
| 2009/0059274 A1* | 3/2009 | Tomita | 358/1.15 |
| 2009/0157906 A1* | 6/2009 | Yanagi | 710/5 |
| 2010/0103456 A1* | 4/2010 | Masuda | 358/1.15 |
| 2010/0188688 A1* | 7/2010 | Selvaraj et al. | 358/1.15 |
| 2010/0299633 A1* | 11/2010 | Minagawa | 715/810 |
| 2011/0038652 A1* | 2/2011 | Kobayashi et al. | 399/167 |
| 2011/0123214 A1* | 5/2011 | Van Vliembergen et al. | 399/82 |

OTHER PUBLICATIONS

David Kappos, Subject Matter Eligibility of Computer Readable Media, US Patent and Trademark Office, Feb. 23, 2010, 1351 OG 212.*

Chinese Office Action issued Dec. 31, 2011 in counterpart application CN201010119538.6.

Chinese Office Action issued in Chinese counterpart application No. CN201010119538.6, dated Mar. 5, 2013.

* cited by examiner

FIG.4A

401 {
<COMMON SETTING>
PRIORITY TO FUNCTION SCREEN AND STATUS SCREEN
INITIAL SCREEN OF FUNCTION SCREEN
INITIAL SCREEN OF STATUS SCREEN
INITIAL FUNCTION AFTER AUTO CLEAR
SETTING OF BUZZER
ON/OFF OF INCH INPUT
ON/OFF OF CASSETTE AUTO SELECTION
REGISTRATION OF SHEET TYPE
CHANGE IN POWER SAVING MODE
SETTING OF DEDICATED TRAY
PRINT PRIORITY
LOCAL PRINT STANDARD MODE
ELECTRIC POWER CONSUMPTION DURING SLEEP
SETTING OF DISPLAY LANGUAGE
SHIFT BETWEEN JOBS
PRIORITY TO CHARACTER/PHOTO IN MONOCHROME
　 PRINTING IN AOTOMATIC COLOR SELECTION MODE
PRINT IMAGE QUALITY/SPEED PRIORITY
}

402 {
<COPY AND SCAN SETTING>
AUTO SORT
ON/OFF OF IMAGE ORIENTATION PRIORITY
ON/OFF OF COPY WAIT TIME DISPLAY
AUTO VERTICAL/HORIZONTAL ROTATION
SELECT DEFAULT SCAN SETTING (= SET STANDARD MODE)
FILE FORMAT
READ DENSITY
}

403 {
<NETWORK-RELATED SETTING>
SETTING OF IP ADDRESS
SETTING OF SUBNET MASK
GATEWAY ADDRESS
USE/DISUSE OF DHCP
USE/DISUSE OF RARP
USE/DISUSE OF BOOTP
DNS SERVER OR IP ADDRESS
HOST NAME
DOMAIN NAME
WINS SOLUTION
SETTING OF WINS SERVER
REGISTRATION IN DNS SERVER
SETTING OF DNS SERVER
}

FIG.4B

404 {
- <TRANSMISSION AND RECEPTION SETTING>
- TRANSMISSION START (TRANSFER) SPEED
- RECEPTION START (TRANSFER) SPEED
- RECEPTION PASSWORD
- RECEPTION DEFAULT ACTION (MEMORY RECEPTION)
- DATA SIZE OF E-MAIL FOR DIVISION TRANSMISSION
- SUBJECT NAME SUBSTITUTED FOR OMISSION OF SUBJECT
- FULL-MODE TRANSMISSION TIME-OUT TIME
- PRINT DURING MDN/DSN RECEPTION
- USE OF ROUTE VIA SERVER
- USE OF REMOTE UI
- LIMITATION OF FAX CONTROL CARD USER
- EXECUTION OR NON-EXECUTION OF TRANSFER
- SECRET NUMBER
- NUMBER OF REGISTRATIONS OF DESTINATIONS AND ABBREVIATED DESTINATIONS
- DESTINATIONS AND ABBREVIATED DESTINATIONS
- RESTRICTION OF TRANSFER INSTRUCTION SOURCE
- PRINTOUT OF RECEIVED ORIGINAL
- FIS SWITCH
- PIN CODE ACCESS
- ECM RECEPTION
- RECORD OF RECEPTION INFORMATION
- PROXY RECEPTION
- RECORD OF TRANSMISSION SOURCE (G4)
- RECEPTION MODE SELECTION
- TERMINATION CALL
- MUMBER OF TIMES OF CALLING
- AUTO RECEPTION SWITCHING
- NUMBER OF SECONDS FOR CALLING
- DOUBLE-SIDED PRINTING

405 {
- <REPORT SETTING>
- UNIVERSAL SEND RESULT REPORT
- G3 FAX TRANSMISSION RESULT REPORT
- RECEPTION RESULT REPORT
- MEMORY BOX RECEPTION REPORT
- REPORT PER 100 HISTORY RECORDS
- REPORT OF ALL HISTORY RECORDS FOR DESIGNATED TIME
- DESIGNATION OF TIME

406 {
- <SYSTEM-RELATED SETTING>
- REGISTRATION/DELETION OF ID/SECRET NUMBER OF SYSTEM ADMINISTRATOR
- REGISTRATION OF NAME OF SYSTEM ADMINISTRATOR
- E-MAIL ADDRESS OF SYSTEM ADMINISTRATOR
- CONTACT OF SYSTEM ADMINISTRATOR
- COMMENT OF SYSTEM ADMINISTRATOR
- REGISTRATION OF DEVICE NAME
- REGISTRATION OF INSTALLATION PLACE OF DEVICE
- SETTING OF INTERFACE

| SETTING ITEM (ID) | SETTING | DATA TYPE | DATA SIZE | DISCRIMINATION INFORMATION |
|---|---|---|---|---|
| ID1 | SAMPLE | STRING | 6 | APPARATUS-SPECIFIC |
| ID2 | 1 | UBYTE | 1 | APPARATUS-SPECIFIC |
| ID3 | 0 | BOOL | 1 | COMMON |

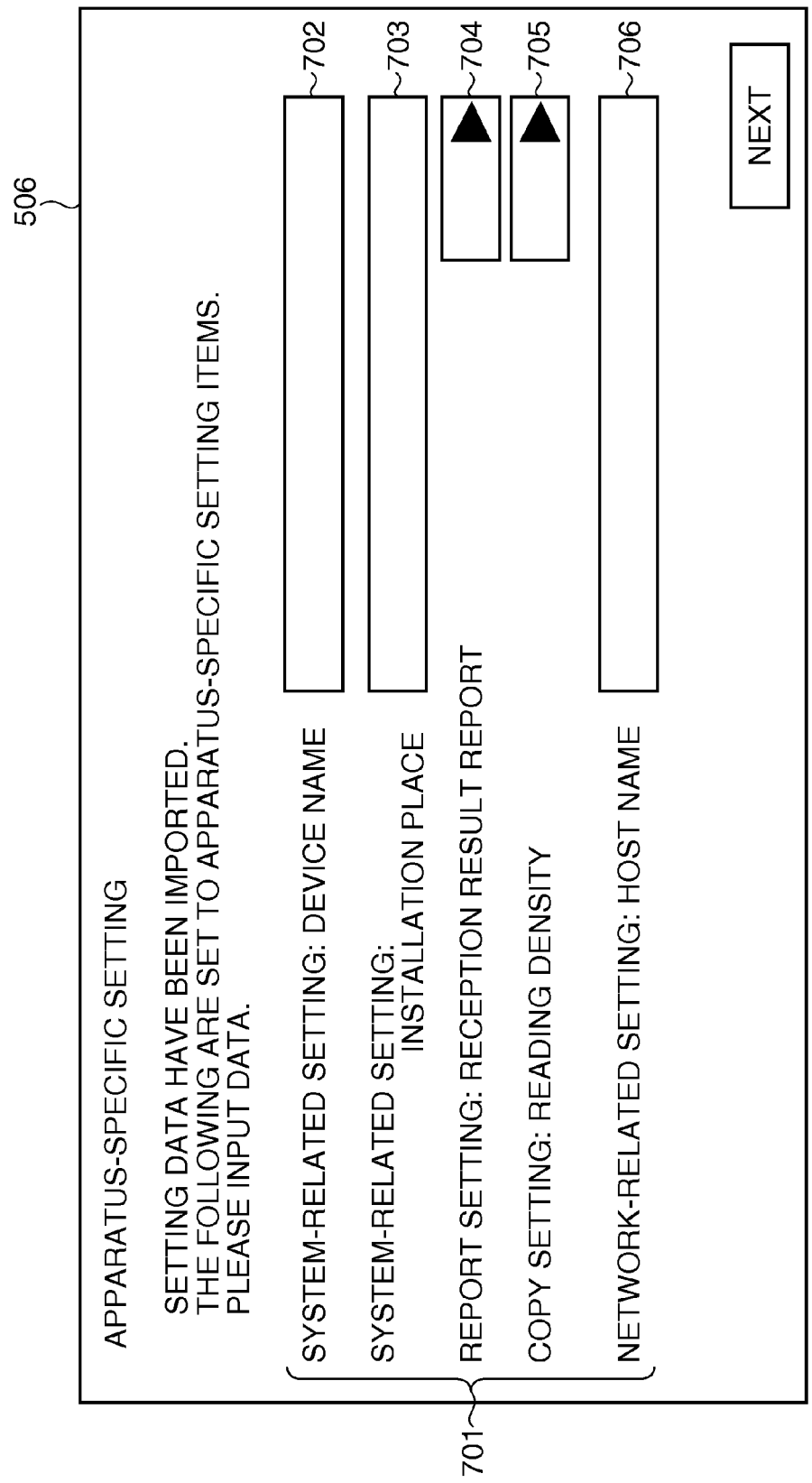

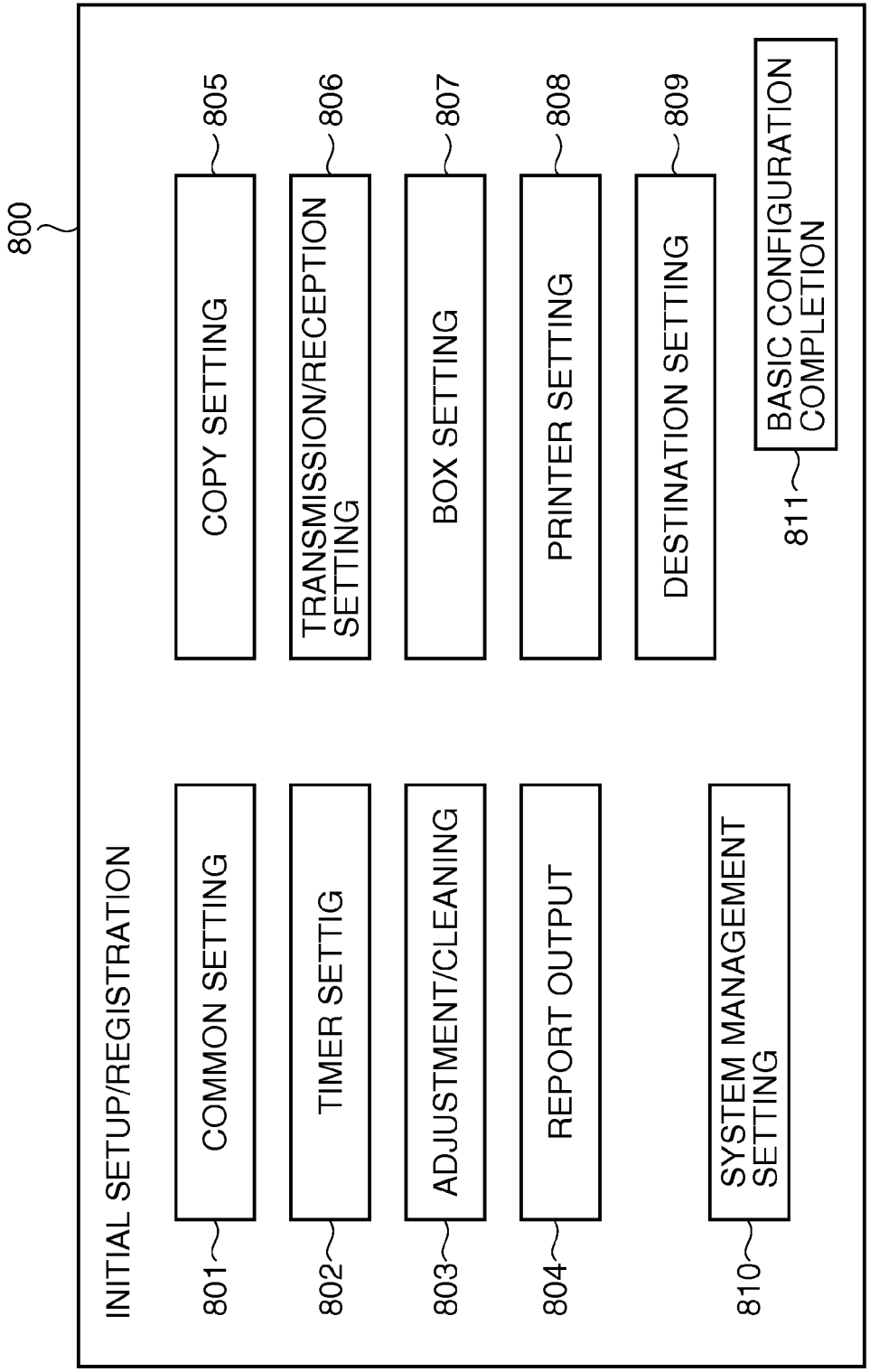

FIG.9

CASES ASSUMED AS TO TIMING IN
WHICH BASIC CONFIGURATION
COMPLETION BUTTON IS PRESSED

CASE 1: AT TIME OF FACTORY SHIPMENT
CASE 2: UPON COMPLETION OF CUSTOMER'S ENVIRONMENTAL SETTING
CASE 3: IMMEDIATELY BEFORE EXPORT

| SETTINGS | CASE 1 | CASE 2 | CASE 3 |
|---|---|---|---|
| ALL ITEMS UNCHANGED AFTER FACTORY SHIPMENT | COMMON | COMMON | COMMON |
| ADMINISTRATOR NAME AND INSTALLATION PLACE | APPARATUS-SPECIFIC | COMMON | COMMON |
| DNS, DHCP, PROXY AND POP | APPARATUS-SPECIFIC | COMMON | COMMON |
| ADDRESS OF COOPERATING DEVICE | APPARATUS-SPECIFIC | COMMON | COMMON |
| DEFAULT SHEET FEEDER/DISCHARGER | APPARATUS-SPECIFIC | APPARATUS-SPECIFIC | COMMON |
| REPORT SETTING | APPARATUS-SPECIFIC | APPARATUS-SPECIFIC | COMMON |

FIG.13A

20XX.M1.D1 [CONFIGURED FOR 20F OF ABC COMPANY]    DATA TABLE (1301)

| SETTING ITEM (ID) | SETTING | DATA TYPE | DATA SIZE | DISCRIMINATION INFORMATION |
|---|---|---|---|---|
| ID1 | SAMPLE | STRING | 6 | APPARATUS-SPECIFIC |
| ID2 | 1 | UBYTE | 1 | APPARATUS-SPECIFIC |
| ID3 | 0 | BOOL | 1 | COMMON |

FIG.13B

20XX.M2.D2 [COLLECTIVELY CONFIGURED BY DATA CENTER]    DATA TABLE (1302)

| SETTING ITEM (ID) | SETTING | DATA TYPE | DATA SIZE | DISCRIMINATION INFORMATION |
|---|---|---|---|---|
| ID1 | TEXT | STRING | 6 | APPARATUS-SPECIFIC |
| ID2 | 20 | UBYTE | 1 | COMMON |
| ID3 | 0 | BOOL | 1 | COMMON |

FIG.13C

20XX.M3.D3 [INITIAL STATE]    DATA TABLE (1303)

| SETTING ITEM (ID) | SETTING | DATA TYPE | DATA SIZE | DISCRIMINATION INFORMATION |
|---|---|---|---|---|
| ID1 | ABC | STRING | 6 | COMMON |
| ID2 | 3 | UBYTE | 1 | COMMON |
| ID3 | 0 | BOOL | 1 | COMMON |

INFORMATION PROCESSING APPARATUS, METHOD OF CONTROLLING INFORMATION PROCESSING APPARATUS, AND STORAGE MEDIUM

BACKGROUND OF THE INVENTION

1. Field of the Invention

The present invention relates to an information processing apparatus requiring a large number of settings to be configured, and a method of controlling the information processing apparatus.

2. Description of the Related Art

Recent digital multifunction peripherals have been becoming more multifunctional and more sophisticated, so that they have an increasing number of setting items. Accordingly, on a user interface via which a user performs setting, the setting items are hierarchically displayed or displayed on different screens, which requires the user to perform setting on a plurality of screens.

Particularly when a digital multifunction peripheral is initially installed (during initial installation) or is replaced, a serviceman or an administrator has to configure various kinds of setting items, such as network-related ones, box-related ones, address-related ones, and user information-related ones, at a time for initial setup, for the digital multifunction peripheral. These setting items are required to be configured on respective associated configuration screens, as mentioned above, which is troublesome.

To solve this problem, there has been proposed a technique in which a reference apparatus is provided for enabling setting information stored therein to be referred to from a desired apparatus which the user desires to set up, and information extracted from the setting information is imported into the desired apparatus, thereby achieving setup of the desired apparatus (Japanese Patent Laid-Open Publication No. H11-161441). This proposal is based on an idea that a group of devices for use under the same environment are only required to be set up in the same manner.

In the above-mentioned Japanese Patent Laid-Open Publication No. H11-161441, information on setting items requiring configuration specific to an apparatus cannot be imported, as it is, into another, and hence these setting items are excluded from the range of setting items on which information is to be imported into the desired apparatus. Therefore, depending on the type of setting information, it is necessary to determine in advance whether or not the information may be imported from the reference apparatus. For example, IP addresses, which can be used as information for identifying apparatuses in a TCP/IP (Transmission Control Protocol/Internet Protocol) network, are unique to the respective apparatuses, and hence the IP addresses are inhibited from being imported, as they are, into other apparatuses.

However, as described above, there are a large number of items of setting information to be configured for an information processing apparatus, such as the digital multifunction peripheral, so that it takes much time and labor for the user to determine on an item-by-item basis whether or not to import. Further, even as to the same setting items, there are various cases depending the uses of the apparatus, including a case where the same settings as those of the reference apparatus may be applied, and a case where the setting items may be configured specifically for each information processing apparatus.

SUMMARY OF THE INVENTION

The present invention provides an information processing apparatus that lightens the workload for a serviceman or an administrator who imports setting information into the information processing apparatus, and more particularly an information processing apparatus that further reduces load on a user, when the setting items are classified into common setting items and apparatus-specific setting items, a method of controlling the information processing apparatus, and a computer-readable storage medium storing a program for causing a computer to execute the method.

In a first aspect of the present invention, there is provided an information processing apparatus including a user interface via which a user can perform an input operation, comprising a storage unit configured to store setting information containing a plurality of settings required for operation control, and discriminating information on each setting for discriminating whether the setting is of a common setting item or of an apparatus-specific setting item, a changing unit configured to change the discriminating information on each of at least two of the plurality of settings of the setting information stored in the storage unit, according to a specific instruction given by the user via the user interface, and an output unit configured to externally output the setting information stored in the storage unit.

In a second aspect of the present invention, there is provided an information processing apparatus including a user interface via which a user can perform an input operation, comprising an acquisition unit configured to externally acquire setting information containing a plurality of settings required for operation control, and discriminating information on each setting for discriminating whether the setting is of a common setting item or of an apparatus-specific setting item, a storage unit configured to be operable when the discriminating information on the setting in the setting information acquired by the acquisition unit is of a common setting item, to store the setting of the common setting item, and a display control unit configured to be operable when the discriminating information on the setting in the setting information acquired by the acquisition unit is of an apparatus-specific setting item, to cause the apparatus-specific setting item to be displayed on the user interface, for prompting the user to perform the input operation for inputting a specific setting.

In a third aspect of the present invention, there is provided a method of controlling an information processing apparatus including a user interface via which a user can perform an input operation, comprising storing setting information containing a plurality of settings required for operation control, and discriminating information on each setting for discriminating whether the setting is of a common setting item or of an apparatus-specific setting item, changing the discriminating information on each of at least two of the plurality of settings of the stored setting information, according to a specific Instruction given by the user via the user interface, and externally outputting the stored setting information.

In a fourth aspect of the present invention, there is provided a method of controlling an information processing apparatus including a user interface via which a user can perform an input operation, comprising externally acquiring setting information containing a plurality of settings required for operation control, and discriminating information on each setting for discriminating whether the setting is of a common setting item or of an apparatus-specific setting item, storing, when the discriminating information on the setting in the acquired setting information is of a common setting item, the setting of the common setting item, and causing, when the discriminating information on the setting in the acquired setting information is of an apparatus-specific setting item, the apparatus-specific setting item to be displayed on the user interface, for prompting the user to perform the input operation for inputting a specific setting.

In a fifth aspect of the present invention, there is provided a computer-readable storage medium that stores a program for causing a computer to execute a method of controlling an information processing apparatus including a user interface via which a user can perform an input operation, wherein the method comprises storing setting information containing a plurality of settings required for operation control, and discriminating information on each setting for discriminating whether the setting is of a common setting item or of an apparatus-specific setting item, changing the discriminating information on each of at least two of the plurality of settings of the stored setting information, according to a specific instruction given by the user via the user interface, and externally outputting the stored setting information.

In a sixth aspect of the present invention, there is provided a computer-readable storage medium that stores a program for causing a computer to execute a method of controlling an information processing apparatus including a user interface via which a user can perform an input operation, wherein the method comprises externally acquiring setting information containing a plurality of settings required for operation control, and discriminating information on each setting for discriminating whether the setting is of a common setting item or of an apparatus-specific setting item, storing, when the discriminating information on the setting in the acquired setting information is of a common setting item, the setting of the common setting item, and causing, when the discriminating information on the setting in the acquired setting information is of an apparatus-specific setting item, the apparatus-specific setting item to be displayed on the user interface, for prompting the user to perform the input operation for inputting a specific setting.

According to the present invention, it is possible to lighten the workload for a serviceman or an administrator who imports setting information into the information processing apparatus. Particularly, it is possible to further reduces the workload for a user, when classifying the setting items into common setting items and apparatus-specific setting items.

Further features of the present invention will become apparent from the following description of exemplary embodiments with reference to the attached drawings.

BRIEF DESCRIPTION OF THE DRAWINGS

FIGS. 4A and 4B are diagrams showing an example of setting information of the information processing apparatus.

FIG. 7 is a diagram showing an example of an apparatus-specific configuration UI displayed on an operation section or the like of the information processing apparatus on the import side.

FIG. 8 is a diagram showing an example of an initial setup/registration screen displayed on an operation section or the like of the information processing apparatus on the export side.

FIG. 9 is a diagram useful in explaining differences in the setting of discriminating information dependent on timing in which a user presses a basic configuration completion button.

FIGS. 13A to 13C are diagrams showing examples of a plurality of data tables which are stored in an information processing apparatus on the export side as an information processing apparatus according to a second embodiment of the present invention.

DETAILED DESCRIPTION OF THE EMBODIMENTS

The present invention will now be described in detail below with reference to the accompanying drawings showing embodiments thereof.

Figure 1:
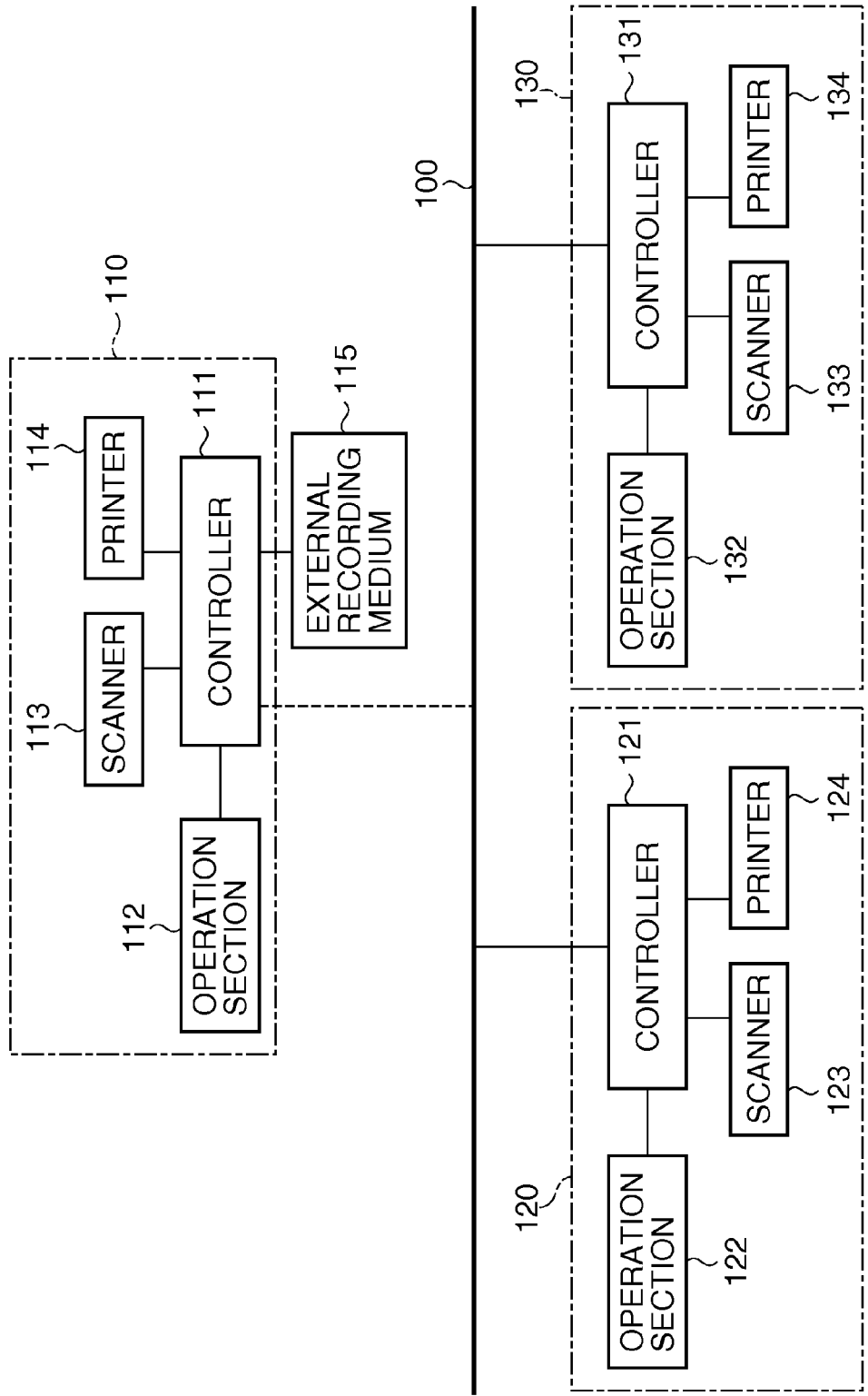
FIG. 1 is a block diagram of an information processing system incorporating information processing apparatuses according to a first embodiment of the present invention.

FIG. 1 is a block diagram of an information processing system incorporating information processing apparatuses according to a first embodiment of the present invention.

Referring to FIG. 1, in the information processing system, a plurality of (three in FIG. 1) information processing apparatuses 110, 120 and 130 are communicably connected to each other via a communication means, such as a LAN 100. Although in the present embodiment, the information processing apparatuses 110, 120 and 130 are each implemented by a digital multifunction peripheral (MFP) that that inputs and outputs images, transmits and receives images, and performs various kinds of image processing, this is not limitative.

The information processing apparatus 110 is comprised of a scanner 113, a printer 114, a controller 111, an operation section 112, which is a user interface, and an external recording medium 115.

The scanner 113, the printer 114, the operation section 112 and the external recording medium 115 are connected to the controller 111 for being controlled by commands from the controller 111.

The information processing apparatus 120 is comprised of a scanner 123, a printer 124, an operation section 122 and a controller 121 for controlling the scanner 123, the printer 124 and the operation section 122.

The information processing apparatus 130 is comprised of a scanner 133, a printer 134, an operation section 132 and a controller 131 for controlling the scanner 133, the printer 134 and the operation section 132. Similarly to the controller 111, the controllers 121 and 131 can have the external recording medium 115 connected thereto.

Next, the software configurations of the information processing apparatuses 110, 120 and 130 will be described with reference to FIG. 2. In the present embodiment, the information processing apparatuses 110, 120 and 130 are identical in software configuration, and hence a description is given of the software configuration of the information processing apparatus 110.

Figure 2:
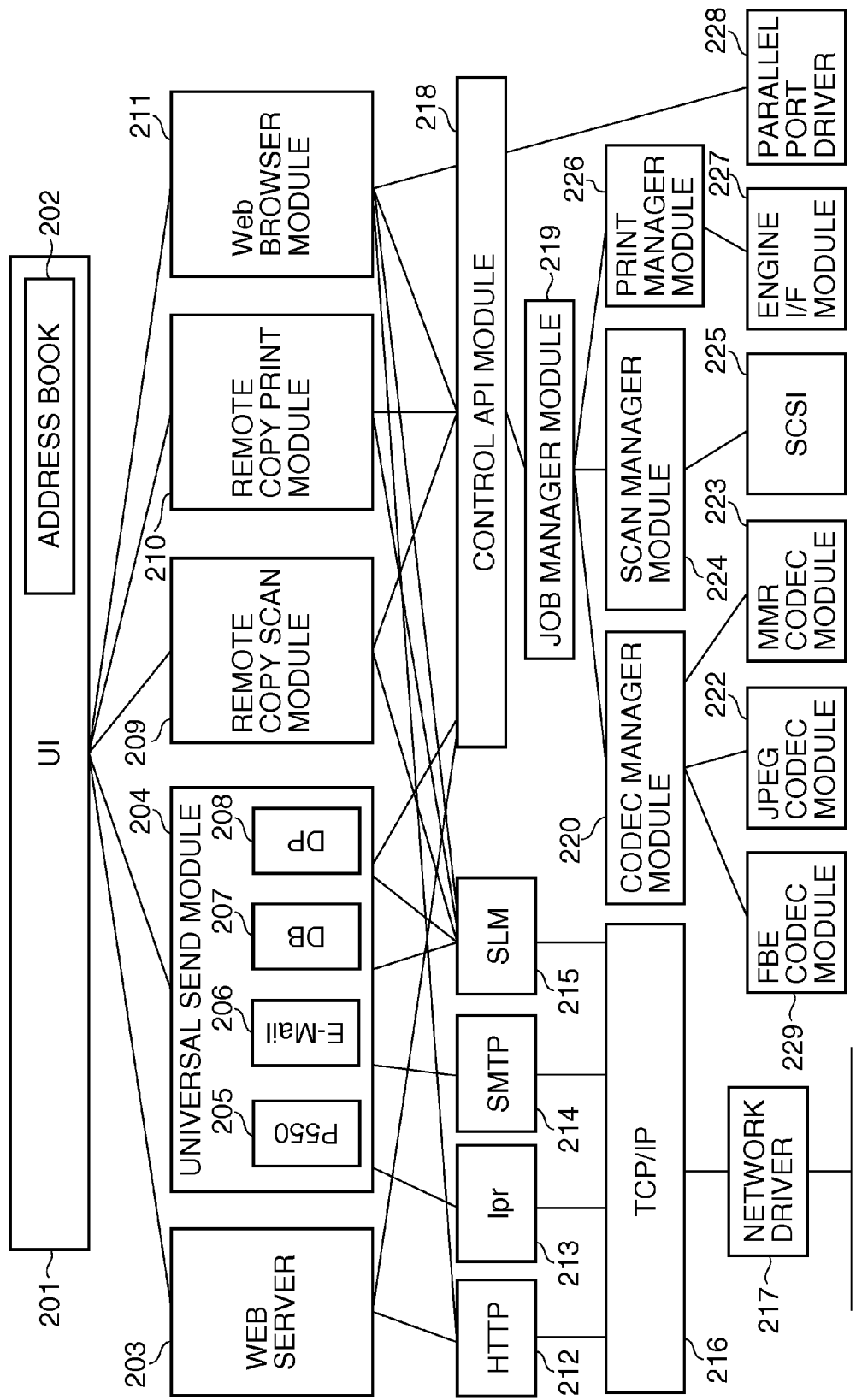
FIG. 2 is a block diagram showing a software configuration of each information processing apparatus.

In FIG. 2, the user interface (hereinafter referred to as "UI") module 201 mediates between the apparatus and the operator's operation for various operations and configuration or setting of the information processing apparatus 110. This module 201 transfers input information to various modules, described hereinafter, in response to the operator's operations so as to make requests for processing or for data settings.

An address-book module 202 manages data delivery destinations, communication destinations, and so forth. Data can be added to, deleted from, or acquired from data managed by the address-book module 202, by an operation via the UI module 201. Further, the address-book module 202 supplies data delivery/communication destination information to modules, described hereinbelow, by operator's operations.

A Web server module 203 notifies a Web client (e.g. a host computer) of management information of the information processing apparatus 110 in response to requests from the Web client. The management information of the information processing apparatus 110 is acquired via a universal send module 204, a remote copy scan module 209, a remote copy print module 210, and a control API module 218, and is sent to the Web clients via a HTTP module 212, a TCP/IP (Transmission Control Protocol/Internet Protocol) communication module 216, and a network driver 217.

A Web browser module 211 is for reading information from various kinds of Web sites (homepages) on the Internet or an intranet and displaying the information.

The universal send module 204 controls data distribution. The universal send module 204 distributes data designated by the operator via the UI module 201 to a communication (output) destination designated by the operator. Further, when the operator instructs data for distribution to be generated using the scanner function of the information processing apparatus 110, the universal send module 204 causes the control API module 218 to operate the information processing apparatus 110 to generate the data.

Further, the universal send module 204 includes a P550 module 205, an E-mail module 206, a database module 207 and a DP (Datagram Protocol) module 208.

The P550 module 205 is executed when a printer is designated as an output destination. The E-mail module 206 is executed when an E-mail address is designated as a communication destination. The database module 207 is executed when a database is designated as an output destination. The DP module 208 is executed when an information processing apparatus similar to the information processing apparatus 110 is designated as an output destination.

The remote copy scan module 209 reads image information using the scanner function of the information processing apparatus 110 and outputs the read image information to another information processing apparatus connected to the information processing apparatus 110 via the network or the like. This makes it possible to perform the copy function executed by the information processing apparatus 110, using the other information processing apparatus.

The remote copy print module 210 prints out image information acquired by another information processing apparatus connected to the information processing apparatus 110 via the network or the like, using the printer function of the information processing apparatus 110. This makes it possible to perform the copy function executed by the information processing apparatus 110, using the other information processing apparatus.

The HTTP module 212 is used by the information processing apparatus 110 in performing HTTP communication. The HTTP module 212 provides communication functions for the Web server module 203 and the Web browser module 211 using the TCP/IP communication module 216. The HTTP module 212 is compatible with various protocols, including HTTP, used on the Web, and also provides communication functions, particularly using security protocols.

An LPR (Line Printer Daemon) module 213 provides a communication function for the P550 module 205 within the universal send module 204, using the TCP/IP communication module 216.

An SMTP (Simple Mail Transfer Protocol) module 214 provides a communication function for the E-mail module 206 within the universal send module 204, using the TCP/IP communication module 216.

An SLM (Salutation Manager) module 215 provides communication functions for the database module 207 and the DP module 208 within the universal send module 204. Further, the SLM module 215 also provides communication functions for the remote copy scan module 209 and the remote copy print module 210, using the TCP/IP communication module 216.

The TCP/IP communication module 216 provides a network communication function for each of the above described modules using the network driver 217. The network driver 217 controls system parts physically connected to the network.

The control API module 218 provides interface with downstream modules including a job manager module 219 for the universal send module 204 and other upstream modules. The control API module 218 thus serves to reduce dependence between the upstream modules and the downstream modules, thereby enhancing versatility of each of the modules.

The job manager module 219 interprets various kinds of processing designated by the above described modules via the control API module 218, and gives instructions to a codec manager module 220, a scan manager module 224 and a print manager module 226. Further, the job manager module 219 performs centralized control of processing carried out by hardware of the information processing apparatus 110.

The codec manager module 220 performs management and control of various types of data compression and expansion during processing designated by the job manager module 219.

An FBE codec module 229 compresses data scanned in scan processing carried out by the job manager module 219 or the scan manager module 224, using an FBE format.

A JPEG (Joint Photographic Expert Group) codec module 222 is used to JPEG-compress data scanned in scan processing carried out by the job manager module 219 or the scan manager module 224. Further, the JPEG codec module 222 also expands JPEG-compressed print data in print processing carried out by the print manager module 226.

An MMR (Modified Modified READ) codec module 223 is used to MMR-compress data scanned in scan processing carried out by the job manager module 219 or the scan manager module 224. Further, the MMR codec module 223 also expands MMR-compressed print data in print processing carried out by the print manager module 226.

The scan manager module 224 performs management and control of scan processing designated by the job manager module 219. A SCSI (Small Computer System Interface) driver 225 provides communication interface between the scan manager module 224 and the scanner 113 internally connected to the information processing apparatus 110.

The print manager module 226 performs management and control of print processing designated by the job manager module 219. An engine interface module 227 provides interface between the print manager module 226 and the printer 114.

A parallel port driver 228 provides interface when data is output to an output device, not shown, via a parallel port.

Next, the hardware configurations of the information processing apparatuses 110, 120 and 130 will be described with reference to FIG. 3. In the present embodiment, the information processing apparatuses 110, 120 and 130 are identical in hardware configuration, and hence a description is given of the hardware configuration of the information processing apparatus 110.

Figure 3:
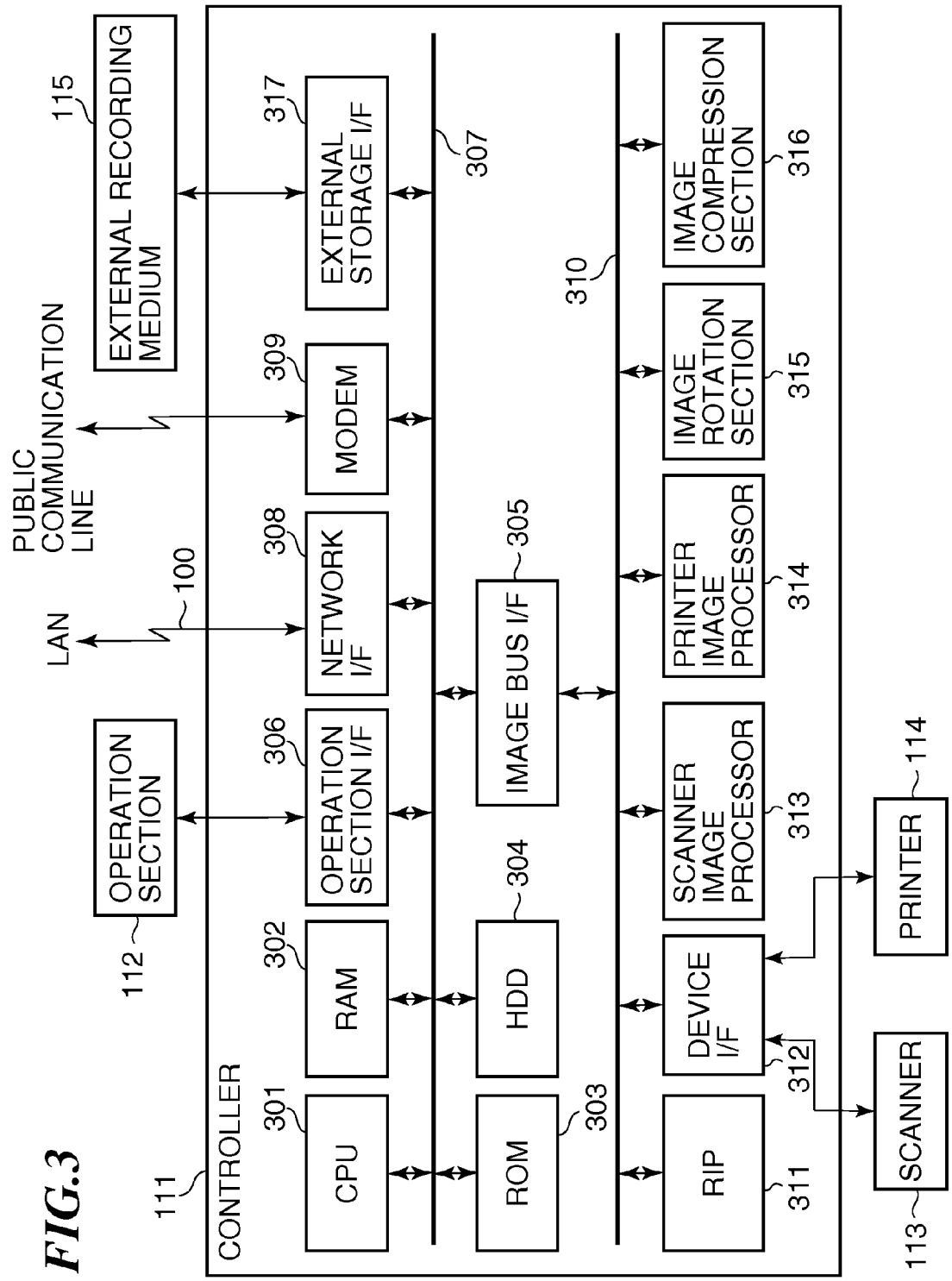
FIG. 3 is a block diagram of the information processing apparatus.

As shown in FIG. 3, the information processing apparatus 110 includes a controller 111 for controlling the overall operation of the apparatus. The controller 111 is connected to the scanner 113 as an image input device and the printer 114 as an image output device, for controlling the scanner 113 and the printer 114, and performs input and output of image information and device information via the LAN and the public communication line.

The controller 111 has a CPU 301. The CPU 301 is connected to a RAM 302, a ROM 303, a HDD 304, an image bus interface 305, an operation section interface 306, a network interface 308, a modem 309 and an external storage interface 317 via a system bus 307.

The RAM 302 is a memory for providing a work area for the CPU 301. The RAM 302 is also used as an image memory for temporarily storing image data. The ROM 303 is a boot ROM, and stores a boot program for the system. The HDD 304 stores system software, image data, and so forth.

The operation section interface 306 provides interface with the operation section 112, for inputting and outputting information from and to the operation section 112. The operation section interface 306 outputs to the operation section 112 image data to be displayed on thereon. The operation section interface 306 also plays the role of transferring information input by the user via the operation section 112 to the CPU 301.

The network interface 308 is connected to the LAN for inputting and outputting information from and to the LAN. The modem 309 is connected to the public communication line for inputting and outputting information from and to the public communication line.

The image bus interface 305 is a bus bridge that connects between the system bus 307 and an image bus 310 for high-speed transmission of image data, and at the same time converts the data structure of the image data.

A RIP (Raster Image Processor) 311, a device interface 312, a scanner image processor 313, a printer image processor 314, an image rotation section 315 and an image compression section 316 are connected to the image bus 310.

The RIP 311 rasterires a PDL (Page Description Language) code received via the LAN into a bitmap image. The device interface 312 connects the scanner 113 and the printer 114 to the controller 111, and performs synchronous-to-asynchronous or asynchronous-to-synchronous conversion of image data. The scanner image processor 313 performs correction, processing, and editing of input image data.

The printer image processor 314 performs correction, resolution conversion, etc. on image data to be printed out. The image rotation section 315 rotates image data. The image compression section 316 carries out expansion and compression processing on multivalued image data by JPEG, and binary image data e.g. by JBIG, MMR or MH.

The external storage interface 317 is connected to a removable external recording medium 115, and is used for storing data and images within the information processing apparatus 110 in the external recording medium 115 or writing data within the external recording medium 115 in the HDD 304 and the like of the information processing apparatus 110.

Next, an example of setting information of the information processing apparatus will be described with reference to FIGS. 4A and 4B.

In FIGS. 4A and 4B, reference numeral 401 denotes a category of common setting information for the apparatus in its entirety, i.e. a group of settings required for controlling the overall operation of the apparatus.

Reference numeral 402 denotes a category of copy and scan setting information, i.e. a group of settings concerning a copy operation and a scanning operation, and reference numeral 403 denotes a category of network-related setting information, i.e. a group of network-related settings required for network connection. Reference numeral 404 denotes a category of transmission and reception setting information, i.e. a group of settings required for transmitting and receiving data by FAX or the like.

Reference numeral 405 denotes a category of report setting information, i.e. a group of setting items concerning reports that record results of transmission and reception of data as a history. Further, reference numeral 406 denotes a category of system-related setting information, i.e. a group of setting items for controlling the apparatus in its entirety. In the present embodiment, the above groups of the settings are collectively configured.

Next, with reference to FIG. 5, a description will be given of an example of operations carried out when setting information is imported from the information processing apparatus 110 into the information processing apparatus 120.

The information processing apparatus 110 is a device which is already in operation and has actually been configured for the setup. A user 503 connects the external recording medium 115 to the information processing apparatus 110 and causes a process to be executed for exporting setting information, whereby a data table 505 (referred to hereinafter) stored in the information processing apparatus 110 and containing a set of settings and discriminating information indicative of whether each setting is of a common setting item or of an apparatus-specific setting item is caused to be stored in the external recording medium 115.

Then, when the user 503 connects the external recording medium 115 to the information processing apparatus 120, each item of setting information items discriminated as a common setting item in the data table 505 is automatically imported into the information processing apparatus 120, and is stored in a setting information storage module.

On the other hand, as for each item of setting information discriminated as an apparatus-specific setting item in the data table 505, an apparatus-specific setting UI 506 (referred to hereinafter) is displayed e.g. on the operation section 122 of the information processing apparatus 120, for prompting the user to input specific data to the item.

Next, the data table 505 will be described with reference to FIG. 6.

Figures 5, 6:
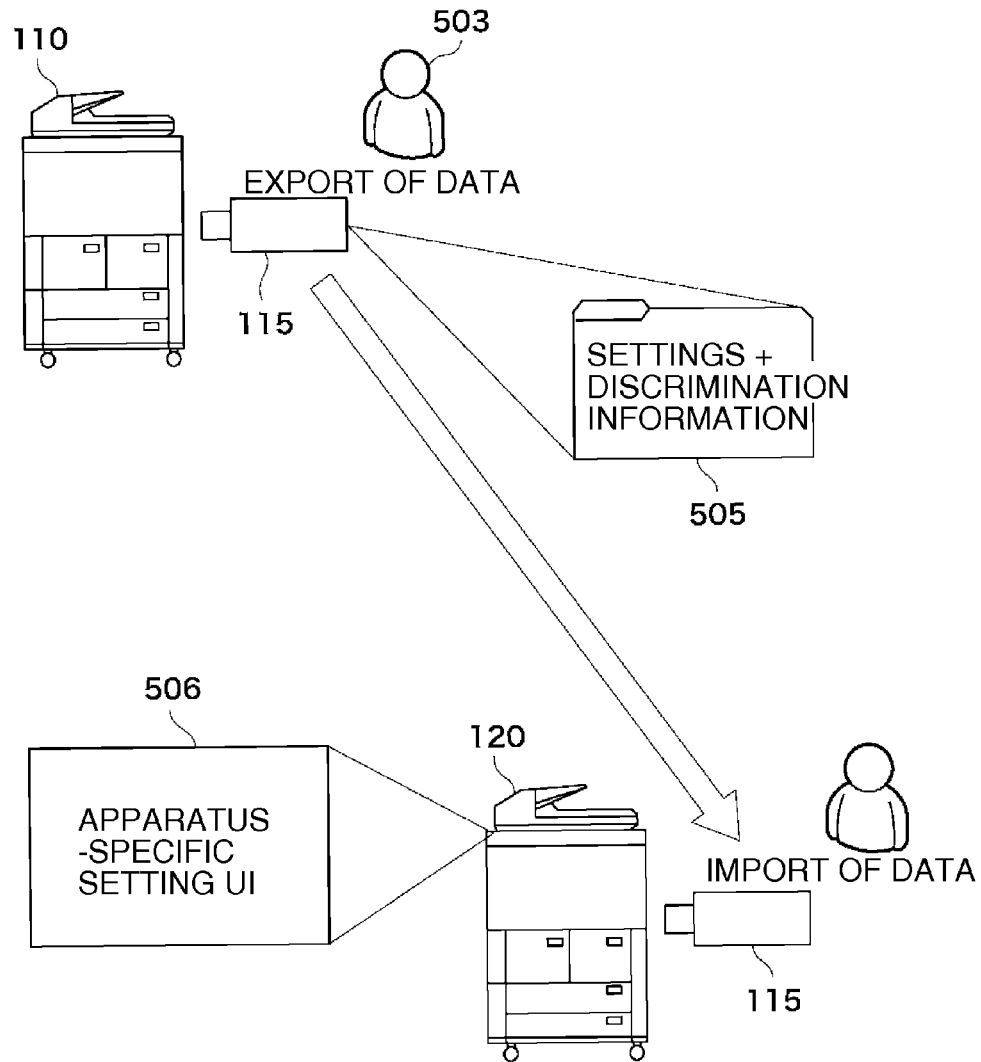
FIG. 5 is a diagram useful in explaining an example of operations carried out when setting information is imported from an information processing apparatus on the export side to an information processing apparatus on the import side.
FIG. 6 is a diagram showing an example of a data table.

As shown in FIG. 6, the data table 505 is data which is exported from the information processing apparatus 110 and is imported into the information processing apparatus 120, and contains items of settings to be configured for the information processing apparatus 120.

The data table 505 contains at least three kinds of information, i.e. information generated by converting setting items to respective IDs, settings and discriminating information. Further, for the sake of efficient setting processing, the data table 505 requires a data type as an identifier indicative of the structure of each data item, and a data size attribute indicative of the length of the data.

The data table 505 is written and stored in a nonvolatile memory area, such as the HDD 304 of the information processing apparatus 110. When an export operation is carried out, the data table 505 is read out from the nonvolatile area, and is stored in the external recording medium 115. When the data table 505 is imported into the information processing apparatus 120, the data table 505 is read out from the external recording medium 115 into the information processing apparatus 120 which is to be configured.

In the data table 505, the setting items (represented by respective IDs into which they are converted) are grouped into various categories as shown in FIGS. 4A and 4B. Here, each ID per se may be a numerical value or a character string insofar as it is data that can be uniquely exchanged between systems.

In the column of "discriminating information" of the data table 505, it is described in association with each ID whether the item represented by the ID is a common setting item or an apparatus-specific setting item, whereby as described above with reference to FIG. 5, respective settings of the common setting items are automatically imported into the information processing apparatus 120, whereas as for respective settings of apparatus-specific setting items, the apparatus-specific setting UI 506 is displayed e.g. on the operation section 122 of the information processing apparatus 120, for prompting the user 503 to input them.

Next, the apparatus-specific setting UI 506 displayed e.g. on the operation section 122 of the information processing apparatus 120 will be described with reference to FIG. 7.

As shown in FIG. 7, the apparatus-specific setting UI 506 displays setting items 701 and input fields 702 to 706 associated with the setting items 701, respectively.

The setting items 701 enumerated as shown in FIG. 7 are those discriminated as the apparatus-specific setting items in the data table 505, when the import operation is performed.

The input fields 702, 703 and 706 are where the user is prompted to enter character strings, so that the user enters characters therein. Further, as in the case of the input fields 704 and 705, for a setting item selectable from a plurality of setting items, an arrow button is pressed to shift to a dedicated setting UI, where the user is prompted to perform an input operation, including a selection operation.

FIG. 8 is a diagram showing an example of an initial setup/registration screen 800 displayed on the operation section 112 or the like of the information processing apparatus 110.

On the initial setup/registration screen 800, buttons 801 to 810 are for performing transition to respective associated configuration screens for categorized setting items, and a basic configuration completion button 811 is an example of specific instruction means for instructing the completion of basic configuration of the apparatus. By pressing the basic configuration completion button 811, the discriminating information on each of all the items of setting information of the device at the time of pressing the basic configuration completion button 811 is set to a common setting item. Further, a setting item the setting of which is changed after the pressing of the basic configuration completion button 811 is subjected to processing for setting the discriminating information on the setting item to an apparatus-specific setting item.

FIG. 9 is a diagram useful in explaining differences in the setting of discriminating information dependent on timing in which the user presses the basic configuration completion button 811.

Referring to FIG. 9, Case 1 is a case in which the basic configuration completion button 811 is pressed at the time of factory shipment of the information processing apparatus 110, and Case 2 is a case in which the basic configuration completion button 811 is pressed after inputting a certain amount of user's environment information. FIG. 9 shows states of discriminating information in the data table 505 exhibited when the data table 505 is exported after the information processing apparatus 110 is used for some time. Case 3 is assumed to be a case in which the basic configuration completion button 811 is pressed immediately before exporting the data table 505.

As is apparent from FIG. 9, in Case 1, the discriminating information on each of all the settings (setting information) is set to a common setting item at the time of factory shipment, and the discriminating information on each of all settings that have undergone any change after the shipment is changed to an apparatus-specific setting item. Therefore, the discriminating information on each of settings that have not been changed by the user after the shipment are common items. The example illustrated in FIG. 9 shows a case where "administrator name and installation place", "DNS, DHCP, proxy and POP", "address of cooperating device", "default sheet feeder/discharger" and "report setting" are configured (changed) after the shipment, and hence these items are each set to an apparatus-specific setting item. In Case 2, since it is assumed that the basic configuration completion button 811 is pressed after inputting a certain amount of user's environment information and thereafter the information processing apparatus 110 is used for some time, the discriminating information on each of several basic settings, including settings of the user's network environment, remains set to a common setting item. More specifically, in the illustrated example, in FIG. 9 illustrates a case where "administrator name and installation place", "DNS, DHCP, proxy and POP" and "address of cooperating device" are configured (changed) by the user to change the discriminating information on each of these to an apparatus-specific setting item, but thereafter, the basic configuration completion button 811 is pressed to change the discriminating information thereon to a common setting item, whereafter "default sheet feeder/discharger" and "report setting" are configured (changed) by the user to change the discriminating information on each of these to an apparatus-specific setting item. Therefore, differently from Case 1, although "administrator name and installation place", "DNS, DHCP, proxy and POP" and "address of cooperating device" are changed after the factory shipment, they are discriminated as a common setting item. On the other hand, "default sheet feeder/discharger" and "report setting" are configured (changed) after the basic configuration completion button 811 is pressed, and hence they are each discriminated as an apparatus-specific setting item. In Case 3, the discriminating information on each of all the settings is in a state changed to a common setting item. Case 3 is a case where the basic configuration completion button 811 is pressed immediately before the data table 505 is exported, that is, a case where there are no items configured (changed)

after the basic configuration completion button 811 is pressed. Therefore, in this case, the discriminating information on each of all the settings is in a state set to a common setting item.

As described above, by pressing the basic configuration completion button 811 in various use cases, it is possible to easily set discriminating information on each of setting items between a common setting item and an apparatus-specific setting item, according to the actual use case.

Figure 10:
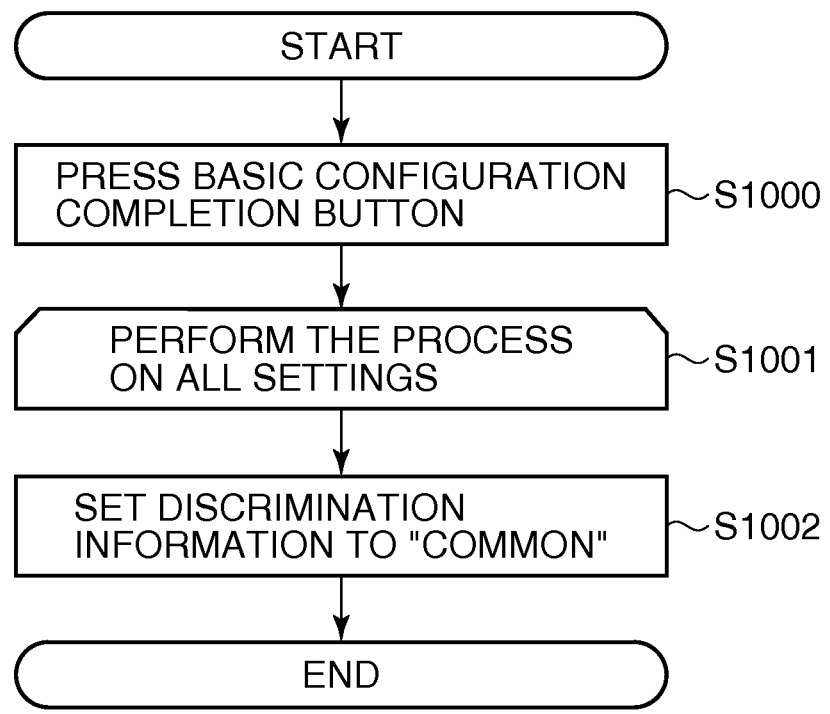
FIG. 10 is a flowchart of a basic configuration completion process performed when the user presses the basic configuration completion button of the information processing apparatus on the export side.

Next, with reference to FIG. 10, a description will be given of a basic configuration completion process which is performed when the user presses the basic configuration completion button 811 of the information processing apparatus 110 on the export side. The steps in FIG. 10 are executed by the CPU 301 by loading an associated program stored in the ROM 303, the HDD 304 or the like of the information processing apparatus 110 into the RAM 302.

In a step S1000, when the basic configuration completion button 811 is pressed, the process proceeds to a step S1001.

In the step S1001, the CPU 301 starts the basic configuration completion process on each of all the settings, and then the process proceeds to a step S1002.

In the step S1002, the CPU 301 rewrites the discriminating information fields of the data table 505 into "Common" to thereby set the discriminating information on each of all the settings to a common setting item, followed by terminating the present process.

Figure 11:
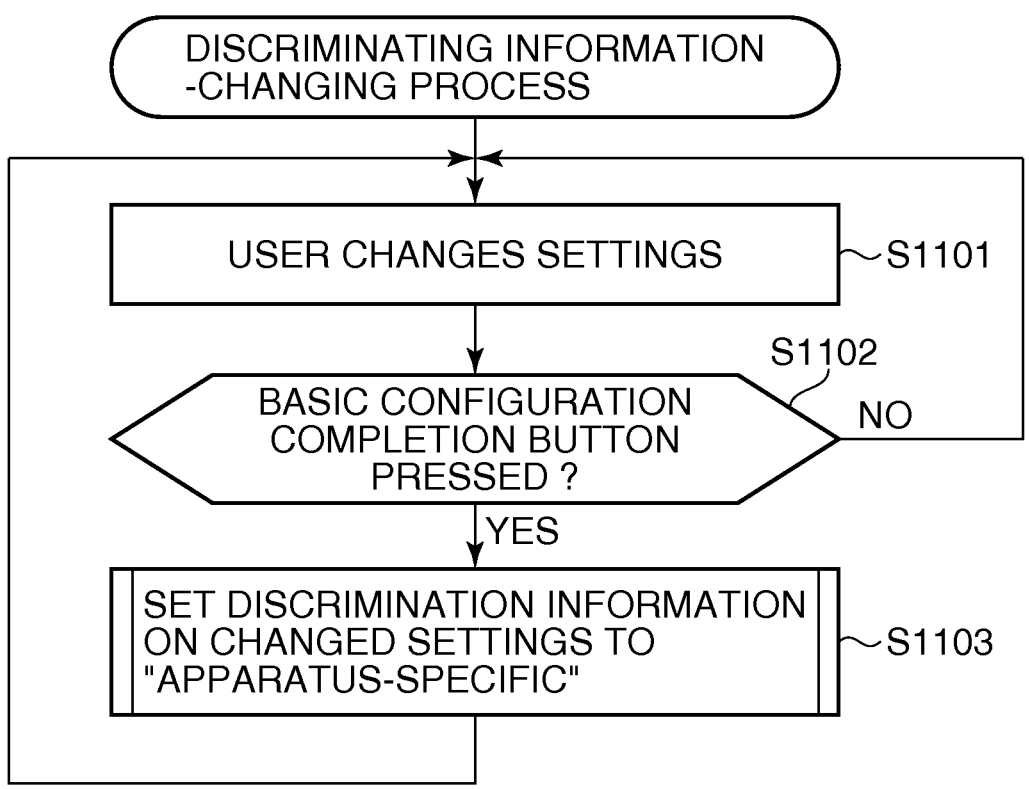
FIG. 11 is a flowchart of an discriminating information-changing process performed by the information processing apparatus on the export side when the user changes a setting during the operation of the information processing apparatus on the export side after the basic configuration completion button is pressed.

Next, with reference to FIG. 11, a description will be given of an discriminating information-changing process which is performed by the Information processing apparatus 110 on the export side when the user changes a setting during the operation of the information processing apparatus 110 on the export side after pressing of the basic configuration completion button 811. The steps in FIG. 11 are executed by the CPU 301 by loading an associated program stored in the ROM 303, the HDD 304 or the like of the information processing apparatus 110 into the RAM 302.

First, in a step S1101, when the user changes a setting in the data table 505, the process proceeds to a step S1102.

In the step S1102, the CPU 301 determines whether or not the basic configuration completion button 811 was pressed in the past. If the basic configuration completion button 811 was pressed in the past, the process proceeds to a step S1103, whereas if the basic configuration completion button 811 was not pressed in the past, the process returns to the step S1101.

In the step S1103, the CPU 301 changes discriminating information on the changed setting to "Apparatus-specific" in the data table 505, and then the process returns to the step S1101.

Figure 12:
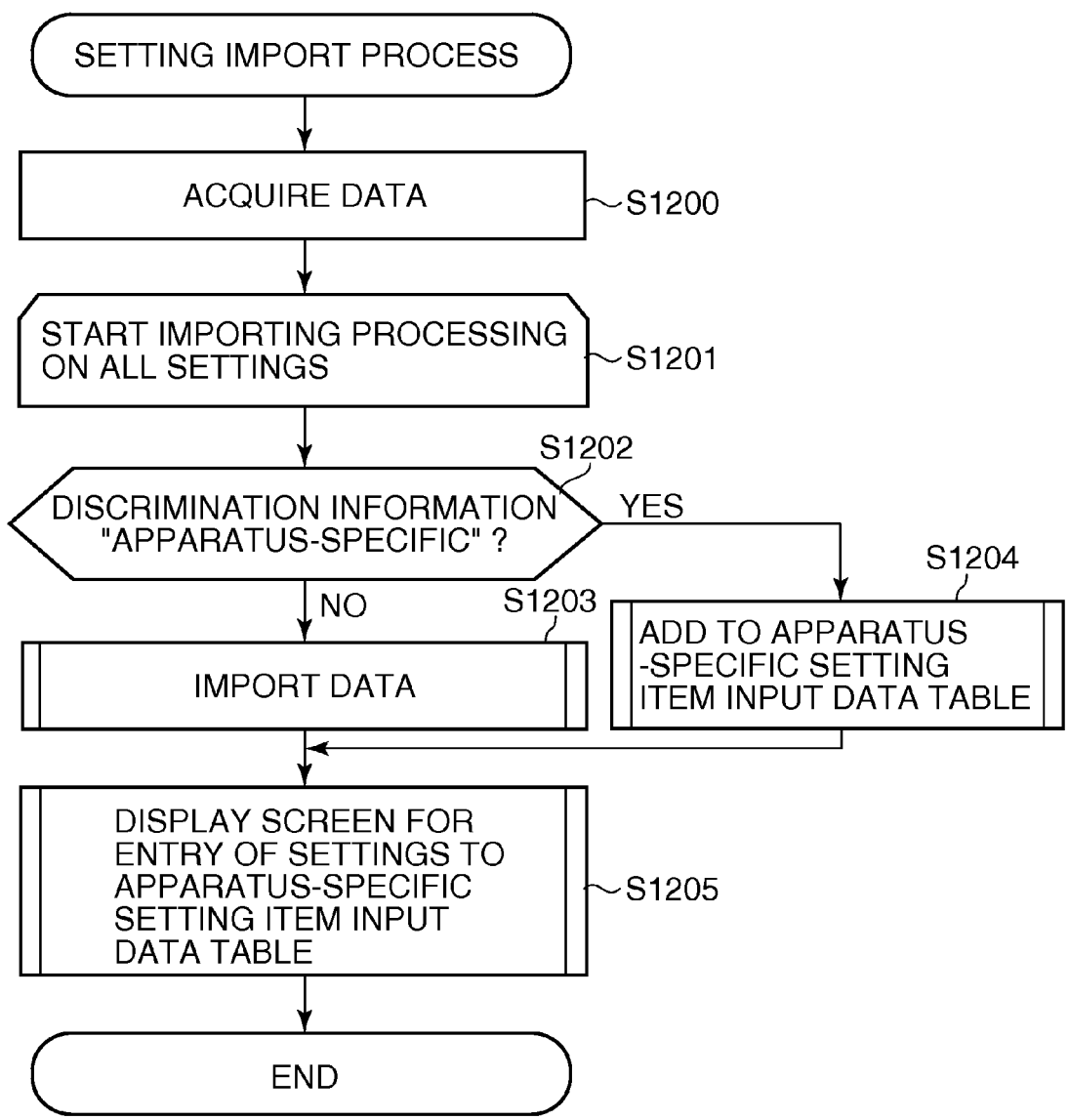
FIG. 12 is a flowchart of a setting import process performed by the information processing apparatus on the import side.

Next, a setting import process performed by the information processing apparatus 120 on the import side will be described with reference to FIG. 12. The steps in FIG. 12 are executed by the CPU 301 by loading an associated program stored in the ROM 303, the HDD 304 or the like of the information processing apparatus 120 into the RAM 302. For convenience of description, the CPU 301 of the information processing apparatus 120 will be referred to hereafter as a CPU 301A.

In a step S1200, when the data table 505 generated by the information processing apparatus 110 on the export side in the process in FIGS. 10 and 11 is acquired via the external recording medium 115 connected to the information processing apparatus 120, the process proceeds to a step S1201.

In the step S1201, the CPU 301A starts importing processing on all the settings acquired in the step S1200.

In a step S1202, the CPU 301A determines whether or not discriminating information on a setting is in a state set to an apparatus-specific setting item. If the discriminating information is not in the state set to an apparatus-specific setting item but in a state set to a common setting item, the process proceeds to a step S1203, whereas if the discriminating information is in a state set to an apparatus-specific setting item, the process proceeds to a step S1204.

In the step S1203, the CPU 301A stores the settings of the data table 505 as they are in the HDD 304 or the like of the information processing apparatus 120 to thereby cause the stored settings to be reflected on the setting information of the information processing apparatus 120.

In the step S1204, the CPU 301A writes the setting item in an apparatus-specific setting item input data table for managing setting items which are required to be configured on an apparatus-by-apparatus basis.

After the above-mentioned process is carried out on all the settings, in a step S1205, the CPU 301A executes display control for displaying the apparatus-specific setting UI 506 e.g. on the operation section 122, for prompting the user to input a setting for each item which is determined to be required to be configured on an apparatus-by-apparatus basis.

As described hereinabove, according to the present embodiment, when setting information of the information processing apparatus 110 on the export side is imported into the information processing apparatus on the import side 120, it is possible to easily determine whether or not a setting of each setting information may be imported. Further, it is possible to easily change discriminating information on each setting between a common setting item and an apparatus-specific setting item according to the use case.

This makes it possible to lighten the workload for a serviceman or an administrator when importing setting information during initial installation or replacement of an information processing apparatus.

Next, with reference to FIGS. 13A, 13B and 13c to FIG. 16, a description will be given of an information processing apparatus according to a second embodiment of the present invention. Portions which are identical or corresponds to those of the above-described first embodiment will be described using the same figures and the same reference numerals of the first embodiment.

In the above-described first embodiment, the description has been given of an example in which the data table 505 (see FIG. 6) stored in the information processing apparatus 110 on the export side is rewritten and updated whenever the basic configuration completion button 811 of the initial setup/registration screen 800 shown in FIG. 8 is pressed.

In contrast, in the present embodiment, as shown in FIGS. 13A to 13c, the information processing apparatus 110 on the export side is configured to store a plurality of data tables 1301 to 1303 for management of snapshots of settings in respective use cases, so as to improve user friendliness.

Referring to FIGS. 13A to 13c, each of the data tables 1301 to 1303 stores a storage date and a character string entered by the user as desired, as table identification information, and when exporting setting information, all the data tables 1301 to 1303 are collectively written into the external recording medium 115.

Figure 14:
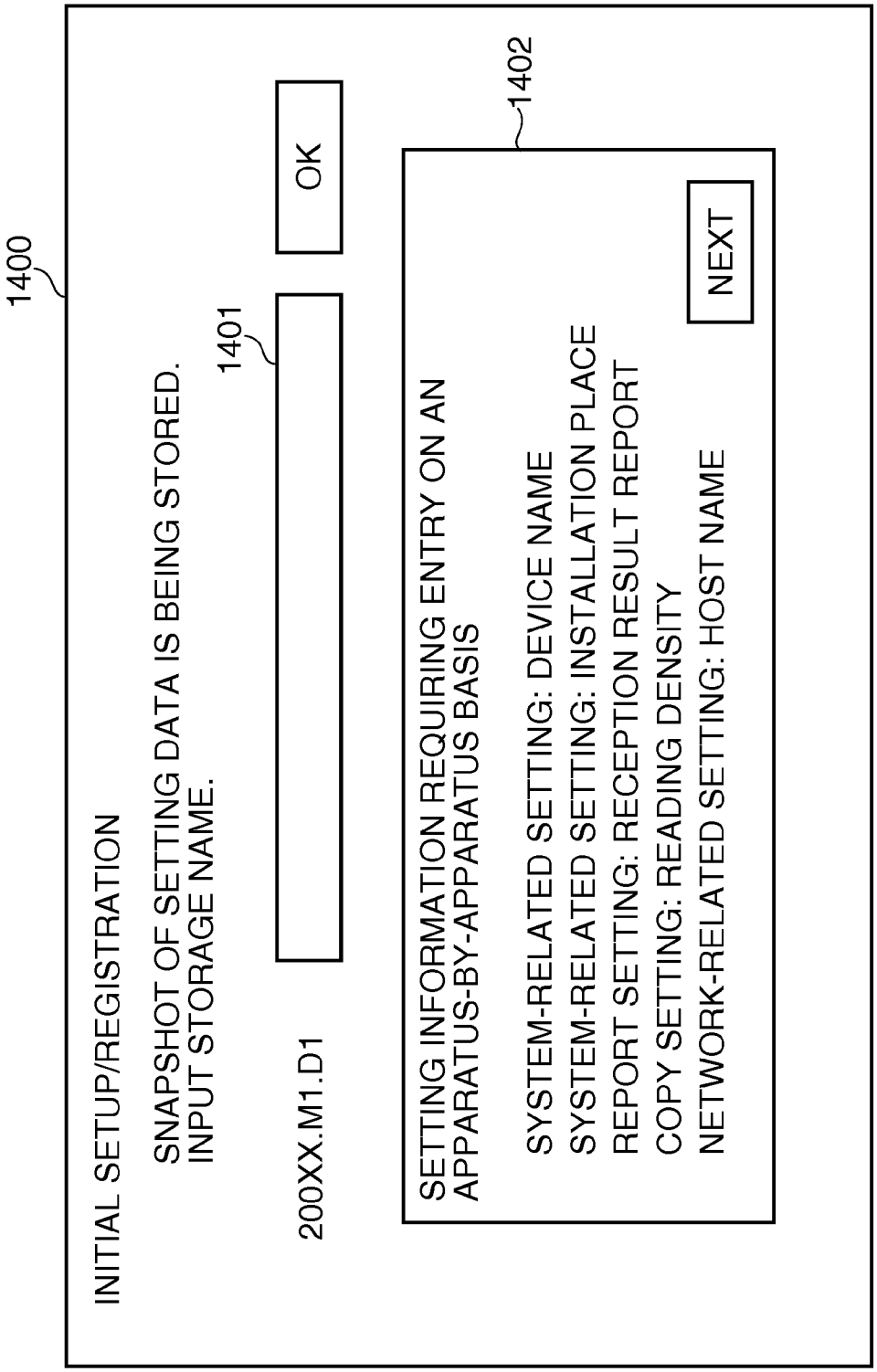
FIG. 14 is a diagram showing an example of a screen displayed on the operation section or the like of the information processing apparatus on the export side after the basic configuration completion button is pressed.

FIG. 14 is a diagram showing a screen 1400 switched after pressing of the basic configuration completion button 811 of the initial setup/registration screen 800 (see FIG. 8) displayed on the operation section 112 or the like of the information processing apparatus 110.

To store setting information as a snapshot in timing in which the user presses the basic configuration completion button 811, the user enters a desired character string (e.g. "Configured for 20F of ABC company") in an input field 1401 and then presses an OK button, whereby the data table 1301 shown in FIG. 13A is newly added. It should be noted that items of setting information each requiring entry on an apparatus-by-apparatus basis are displayed in advance on a display field 1402, so as to cause the user to confirm the items.

Figure 15:
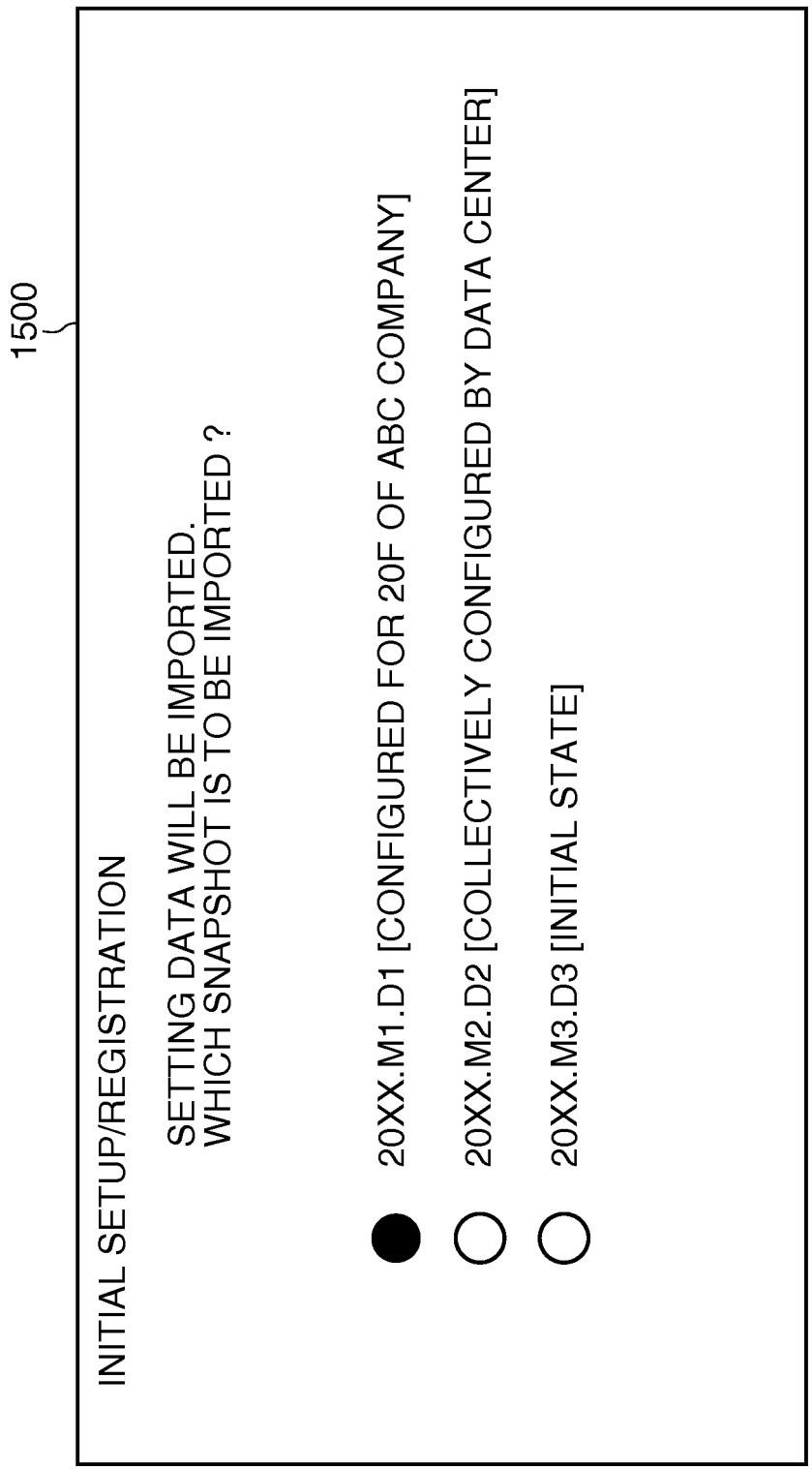
FIG. 15 is a diagram showing an example of a screen displayed on the operation section or the like of the information processing apparatus on the export side when an external recording medium is connected to the information processing apparatus on the import side.

When the external recording medium 115 having the data tables 1301 to 1303 written therein is connected to the information processing apparatus on the import side 120, a selection screen 1500 shown in FIG. 15 is displayed on the operation section 112 or the like of the information processing apparatus 120.

On this selection screen 1500, the dates and the desired character strings for identifying the data tables 1301 to 1303 stored in the external recording medium 115, respectively, are displayed, and selection of one of the data tables 1301 to 1303 causes the selected data table to be imported into the information processing apparatus 120.

Figure 16:
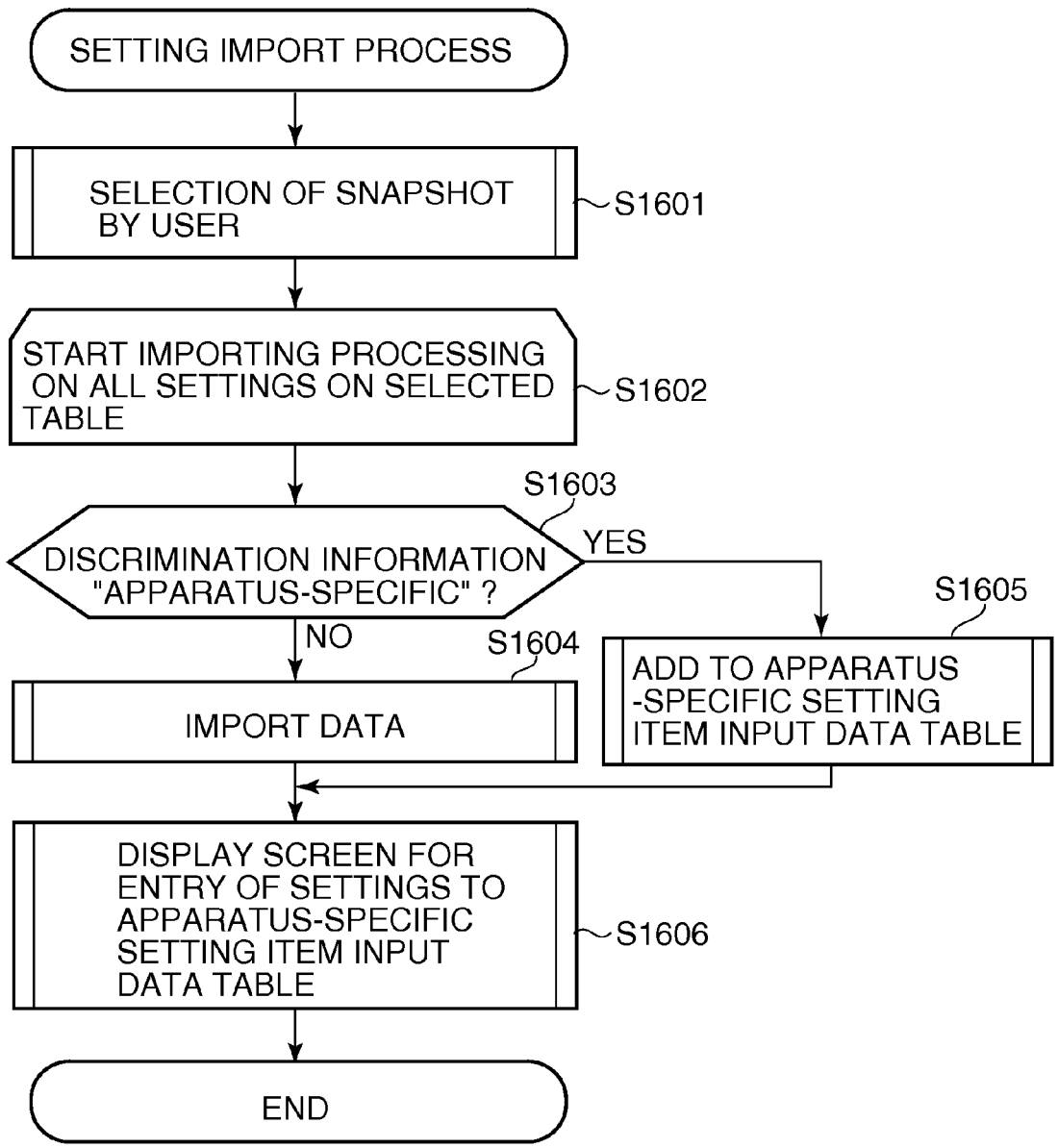
FIG. 16 is a flowchart of a setting import process performed by the information processing apparatus on the import side.

Next, a setting import process performed by the information processing apparatus on the import side 120 will be described with reference to FIG. 16. The steps in FIG. 16 are executed by the CPU 301A by loading an associated program stored in the ROM 303, the HDD 304 or the like of the information processing apparatus 120 into the RAM 302.

First, in a step S1601, the CPU 301A displays the selection screen 1500 shown in FIG. 15 e.g. on the operation section 122, and when the user selects one of the data tables on the selection screen 1500, the process proceeds to a step S1602.

In the step S1602, the CPU 301A starts importing processing on all the settings in the data table selected in the step S1601, and then the process proceeds to a step S1603.

In the step S1603, the CPU 301A determines whether or not discriminating information on each setting is in a state set to an apparatus-specific setting item. If the discriminating information is not in a state set to an apparatus-specific setting item but in a state set to a common setting item, the process proceeds to a step S1604, whereas if the discriminating information is in a state set to an apparatus-specific setting item, the process proceeds to a step S1605.

In the step S1604, the CPU 301A stores the settings of the data table 505 selected in the step S1601, as they are, in the HDD 304 or the like of the Information processing apparatus 120 to thereby cause the stored settings to be reflected on setting information.

In the step S1605, the CPU 301A writes the setting item in an apparatus-specific setting item input data table for managing setting items which are required to be configured on an apparatus-by-apparatus basis.

After the above-mentioned process is carried out on all the settings, in a step S1606, the CPU 301A executes display control for displaying the apparatus-specific setting UI 506 (see FIG. 7) e.g. on the operation section 122, for prompting the user to input a setting for each item which is determined to be required to be configured on an apparatus-by-apparatus basis. The other elements of construction of the present embodiment and advantageous effects thereof are the same as described as to the first embodiment.

It should be noted that the present invention is not limited to the above-described embodiments, but it can be practiced in various forms, without departing from the spirit and scope thereof. Although in the above-described embodiments, setting information is exported/imported via an external recording medium, they may be exported/imported without via the external recording medium. For example, setting information may be exported and imported via communication means, such as the LAN 100. In this case, settings and discriminating information thereon, which are once stored in the external recording medium in the above-described embodiments, are directly transmitted from an information processing apparatus on the export side to an information processing apparatus on the import side via the network. In this case as well, the information processing apparatus on the import side performs the same setting import process as described with reference to FIG. 12 (or FIG. 16).

Further, the steps in the present invention can be realized also by executing software (program) acquired via a network or from recording media of various types, using a processing unit (CPU or a processor) of an image processing apparatus or an information processing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-038931, filed Feb. 23, 2009, which is hereby incorporated by reference herein in its entirety.

What is claimed is:

1. An information processing apparatus comprising:
    a storage device storing first setting information containing IDs respectively indicating a plurality of settings required for operation control of the information processing apparatus, a first setting value corresponding to each of the IDs, and first discriminating information corresponding to each of the IDs for discriminating whether each of the settings indicated by each of the IDs is of a common setting item or of an apparatus-specific setting item;
    a user interface that allows a user to perform an input operation; and
    a controller programmed to execute:
    an acquisition task that externally acquires second setting information containing the IDs, a second setting value corresponding to each of the IDs, and second discriminating information corresponding to each of the IDs for discriminating whether each of the settings indicated by each of the IDs is of a common setting item or of an apparatus-specific setting item;
    a storing/reflecting task that, in a case where the second discriminating information corresponding to one of the IDs in the second setting information acquired by said acquisition task discriminates that a setting indicated by the one ID is of a common setting item, stores the second setting value corresponding to the one ID in the storage device to reflect the stored second setting value as the setting information of the information processing apparatus; and
    a display control task that:
    in a case where the second discriminating information corresponding to another of the IDs in the second setting information acquired by said acquisition task discriminates that a setting indicated by the another ID is of an apparatus-specific setting item, displays an input screen on the user interface for prompting the user to input a specific setting value corresponding to the another ID; and in a case where the second discriminating information corresponding to the another ID in the second setting information acquired by said acquisition task discriminates that the setting indicated by the another ID is of a common setting item, does not display the input screen on the user interface, wherein the storing/reflecting task stores, in the storage device, the specific setting value input by the user via the input screen to reflect as the setting information of the information processing apparatus, in a case where the second discriminating information corresponding to the another ID in the second setting information acquired by said acquisition task discriminates that the setting indicated by the another ID is of an apparatus-specific setting item.

2. The information processing apparatus according to claim 1, wherein:

the acquisition task externally acquires the second setting information from a non-transitory external recording medium, in a case where a plurality of sets of the second setting information are stored in the non-transitory external recording medium, said display control task displays a selection screen on the user interface for enabling the user to select one of the plurality of sets of the second setting information, and said acquisition task acquires the second setting information selected on the selection screen.

3. The information processing apparatus according to claim 1, wherein the acquisition task acquires the second setting information from a non-transitory external recording medium connected to the information processing apparatus.

4. The information processing apparatus according to claim 1, wherein the display control task displays the input screen for prompting the user to input each value for the plurality of apparatus-specific setting items.

5. A method of controlling an information processing apparatus including a storage device and a user interface that allows a user to perform an input operation, the method comprising:

a storing step of storing, in the storage device, first setting information containing IDs respectively indicating a plurality of settings required for operation control, of the information processing apparatus, a first setting value corresponding to each of the IDs, and first discriminating information corresponding to each of the IDs for discriminating whether each of the settings indicated by each of the IDs is of a common setting item or of an apparatus-specific setting item;

an acquiring step of externally acquiring second setting information containing the IDs, a second setting value corresponding to each of the IDs, and second discriminating information corresponding to each of the IDs for discriminating whether each of the settings indicated by each of the IDs is of a common setting item or of an apparatus-specific setting item;

a storing/reflecting step of storing, in the storage device, in a case where the second discriminating information corresponding to one of the IDs in the second setting information acquired in the acquiring step discriminates that a setting indicated by the one ID is of a common setting item, the second setting value corresponding to the one ID to reflect the stored second setting value as the setting information of the information processing apparatus;

a displaying step of displaying, in a case where the second discriminating information corresponding to another of the IDs in the second setting information acquired in the acquiring step discriminates that a setting indicated by the another ID is of an apparatus-specific setting item, an input screen on the user interface for prompting the user to input a specific setting value corresponding to the another ID;

a non-displaying step of not displaying, in a case where the second discriminating information corresponding to the another ID in the second setting information acquired in the acquiring step is of a common setting item, the input screen on the user interface; and wherein the storing/reflecting step stores, in the storage device, the specific setting value input by the user via the input screen to reflect as the setting information of the information processing apparatus, in a case where the second discriminating information corresponding to the another ID in the second setting information acquired in the acquiring step discriminates that the setting indicated by the another ID is of an apparatus-specific setting item.

6. A non-transitory computer-readable storage medium that stores a program executable by a computer to execute a method of controlling an information processing apparatus including a storage device and a user interface that allows a user to perform an input operation, the method comprising the steps of:

a storing step of storing, in the storage device, first setting information containing IDs respectively indicating a plurality of settings required for operation control of the information processing apparatus, a first setting value corresponding to each of the IDs, and first discriminating information corresponding to each of the IDs for discriminating whether each of the settings indicated by each of the IDs is of a common setting item or of an apparatus-specific setting item;

an acquiring step of externally acquiring second setting information containing the IDs, a second setting value corresponding to each of the IDs, and second discriminating information corresponding to each of the IDs for discriminating whether each of the settings indicated by each of the IDs is of a common setting item or of an apparatus-specific setting item;

a storing/reflecting step of storing, in the storage device, in a case where the second discriminating information corresponding to one of the IDs in second setting information acquired in the acquiring step discriminates that a setting indicated by the one ID is of a common setting item, the second setting value corresponding to the one ID to reflect the stored second setting value as the setting information of the information processing apparatus;

a displaying step of displaying, in a case where the second discriminating information corresponding to another of the IDs in the second setting information acquired in the acquiring step discriminates that a setting indicated by the another ID is of an apparatus-specific setting item, an input screen on the user interface for prompting the user to input a specific setting value corresponding to the another ID;

a non-displaying step of not displaying, in a case where the second discriminating information corresponding to the another ID in the second setting information acquired in the acquiring step is of a common setting item, the input screen on the user interface; and wherein the storing/reflecting step stores, in the storage device, the specific setting value input by the user via the input screen to reflect as the setting information of the information processing apparatus, in a case where the second discriminating information corresponding to the another ID in the second setting information acquired in the acquiring step discriminates that the setting indicated by the another ID is of an apparatus-specific setting item.

* * * * *